United States Patent
Jones

(10) Patent No.: US 7,825,365 B2
(45) Date of Patent: Nov. 2, 2010

(54) FIBER-OPTIC HARNESS TESTING APPARATUS AND RELATED METHODS

(75) Inventor: Richard C. Jones, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 238 days.

(21) Appl. No.: 12/202,914

(22) Filed: Sep. 2, 2008

(65) Prior Publication Data

US 2010/0051791 A1    Mar. 4, 2010

(51) Int. Cl.
    *G01J 1/42*    (2006.01)
(52) U.S. Cl. .............. 250/227.11; 250/227.15; 250/227.24; 250/227.28; 324/512; 385/88
(58) Field of Classification Search ............ 250/227.11, 250/227.14, 227.15, 227.24, 227.28; 324/501, 324/521, 527; 356/73.1; 385/27, 78, 88, 385/89
    See application file for complete search history.

(56) References Cited

U.S. PATENT DOCUMENTS

| | | | |
|---|---|---|---|
| 4,373,777 A | | 2/1983 | Borsuk et al. |
| 5,165,002 A | | 11/1992 | Cumberledge et al. |
| 5,448,676 A | | 9/1995 | White et al. |
| 5,636,310 A | * | 6/1997 | Walles .................... 385/139 |
| 5,661,843 A | | 8/1997 | Rickenbach et al. |
| 5,778,122 A | | 7/1998 | Giebel et al. |
| 5,809,191 A | | 9/1998 | Stevens et al. |
| 5,940,559 A | | 8/1999 | Noll |
| 5,960,137 A | | 9/1999 | Noll |
| 6,666,400 B2 | | 12/2003 | White, III |
| 6,861,845 B2 | | 3/2005 | Taylor et al. |
| 7,026,603 B2 | | 4/2006 | Taylor et al. |
| 7,060,966 B2 | | 6/2006 | Taylor et al. |
| 7,157,692 B2 | | 1/2007 | Taylor et al. |
| 2004/0090616 A1 | * | 5/2004 | French et al. ............ 356/73.1 |

OTHER PUBLICATIONS

Gregory B. Noll, Reducing Nominal Data Loss: The Evolution of the D38999 Series III Style Advanced Fiber Optic Connector and Termini, Glenair—A World of Interconnect Solutions, http://www.glenair.com/html/fiber1.htm, Dec. 2, 2007, 6 pages.

Gregory B. Noll, Composite MIL-DTL-38999 Style Fiber Optic Connectors and MIL-T-29504 Termini, Glenair—A World of Interconnect Solutions, http://www.glenair.com/composite/a.html, Oct. 18, 2007, 2 pages.

* cited by examiner

*Primary Examiner*—Kevin Pyo
(74) *Attorney, Agent, or Firm*—Bracewell & Giuliani LLP

(57) ABSTRACT

A fiber optic harness testing apparatus and method of forming termini for a harness testing apparatus, are provided. The apparatus can include an analyzer to determine an attenuation value between an electrical form transmit test signal and an electrical form return test signal to determine an attenuation across one or more optical fibers of a fiber-optic harness under test, and a plurality of electrical test leads each including a test lead connector adapted to mechanically and optically interface the electrically conductive test leads and the analyzer with the fiber-optic harness under test. Each test lead connector can include a set of test lead connector termini. Each test lead connector terminus can include an optically active element to optically interface with a corresponding fiber-optic harness connector terminus positioned in one or more of the connectors of the fiber-optic harness under test.

21 Claims, 5 Drawing Sheets

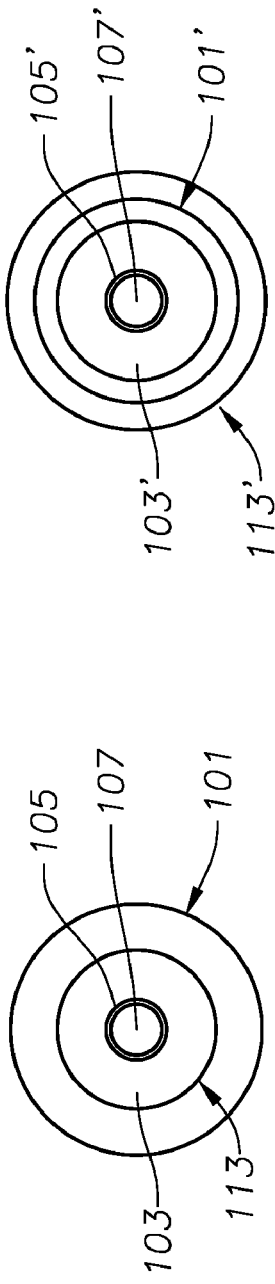
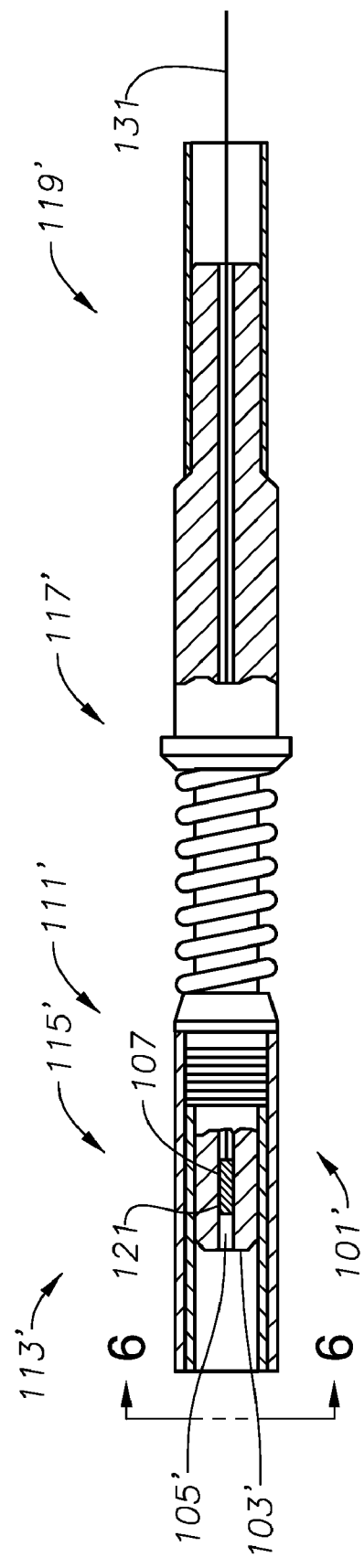

FIBER-OPTIC HARNESS TESTING APPARATUS AND RELATED METHODS

BACKGROUND OF THE INVENTION

1. Field of the Invention

The present invention relates to apparatus and methods for testing fiber optics, specifically, fiber-optic testing apparatus for testing fiber-optic harnesses and related methods.

2. Description of Related Art

Due to its flexibility and ability to be bundled, fiber optic systems have become an extremely effective telecommunication and networking medium for transmitting both analog and digital data signals. For example, as a result of the substantial difference in the amount of attenuation of the signal in the fiber vs. signal attenuation in electrical conductors and cables, fiber optic systems have been employed to replace copper wiring used to provide long-distance communications. Also, fiber optic systems can provide a higher bandwidth, i.e., the light signals can be modulated at rates as high as 40 Gb/s or more, and through wavelength division multiplexing, each fiber in a fiber-optic bundle can support numerous independent channels.

Fiber optic systems are also employed to provide short distance communications. In a building or a vehicle, for example, application of fiber optics instead of electrical conductors can not only save space due to its higher bandwidth capability, but can enhance signal quality, i.e., fiber optics are not affected by electromagnetic interference. Fiber optics also have the advantage of being able to be employed in areas where flammable fumes are present, without the danger of ignition inherent with electrical transmission media.

Such characteristics were recognized by the U.S. Air Force as early as 1976 when it began replacing electrical wiring harnesses in certain aircraft with optical datalinks in an effort to reduce weight and to provide radiofrequency interference, electromagnetic interference, and electromagnetic pulse immunity. The optical datalinks were installed and routed through the aircraft in harnesses similar to that used for electrical wires.

There are two methods used to test these optical datalink harnesses. The first, and traditionally most accurate method, is testing one channel at a time with probes that are referenced and mated with the channel under test. Such methodology is described, for example, in U.S. Pat. No. 5,940,559 by Noll, titled "Fiber-optic Test Probe and Connector Adapter for Testing Fiber-optic Connector Harnesses," and in U.S. Pat. No. 7,060,966 by Taylor et al., titled "Fiber Optic Tester." The second method is to use a fiber optic harness tester, such as, for example, a multi-channel tester manufactured by DIT-MCO, having offices in Kansas City, Mo., to test multiple channels. The fiber-optic harness tester comprises multiple fiber-optic mating harnesses (optical test leads) adapted to connect to each harness connector in the aircraft. The mating harnesses of the tester include connectors having fiber optic termini, which mate with fiber optic termini in matched connectors of the aircraft harnesses. The mating harnesses also include connectors that are plugged into fiber optic light ports in a central testing unit which includes a controller computer that cycles between all the fiber-optic channels and records measurements. An analyzer converts electrical signals to light signals and transmits the light signals over the optical fiber of the fiber-optic mating harness, and through the aircraft harness being tested, which is returned through another set of optical fibers of another fiber-optic mating harness. The analyzer then converts the received-light signals to an electrical signal used to measure attenuation, which provides an indication of the quality of the aircraft harness being tested.

The inventor has recognized that there exists, however, a significant problem in maintaining reference quality termini end faces to make accurate measurements. Further recognized by the inventor is that users implementing such fiber-optic harness testing programs have had substantial difficulty in maintaining just two probe end face for the single channel method, and, if employing fiber optic harness testers, such as that manufactured by DIT-MCO, must maintain over 200 end faces clean and free of scratches and pits in order to maintain a reference quality and to prevent the potential of transferring damage from the test side end face to the aircraft fiber end face, or vice versa.

Although the multichannel tester has a potential for saving time, in practice, instead of saving time over the single channel method, more time is needed repeating measurements because the end face was dirty or time is wasted replacing good aircraft fibers rejected and removed because the test side end face was bad (i.e., the unit provides false failures), or a shattered test side end face damages an aircraft fiber end face. Further, such multichannel testing system requires at least two people to manage all the optical test cables and a very large central testing unit. Additionally, the optical cables of the mating harness which optically interface the central testing unit with the aircraft harness, and the connectors for the mating harness which house the fiber optic termini are extremely susceptible to breakage. In practice, such fiber-optic cables frequently suffer damage due to other equipment or personnel transiting between the central testing unit and the end connectors that interface with the aircraft harness connectors.

Accordingly, recognized is the need for a fiber-optic testing apparatus capable of testing fiber optic harnesses, which improves the ease, speed, and accuracy of testing fiber-optic harnesses, which is portable and easy to manipulate by a single person, which does not use a mating harness containing optical cables, and which does not require optical fiber-optical fiber contact between fiber optic termini. Also recognized is the need for a method of retrofitting fiber-optic termini for a test lead connector for an analyzer of a fiber optic harness testing apparatus which uses electrical cabling instead of optical cabling in its mating harness.

SUMMARY OF THE INVENTION

In view of the foregoing, embodiments of the present invention advantageously provide an apparatus capable of testing fiber optic harnesses, which improves the ease, speed, and accuracy of testing fiber optic harnesses, which is robust and inexpensive to manufacture, which is portable and easy to manipulate by a single person, which does not use a mating harness containing optical cables, and which does not require optical fiber-optical fiber contact between fiber optic termini. Embodiments of the present invention instead include electrical cabling in its mating harness/umbilical cord/test leads (in place of optical cabling), which extend between a testing unit/controller/analyzer and the end connectors which connect to associated connectors in the fiber optic harness (e.g., aircraft optical fiber harness) under test, thus making the mating harness/umbilical cord/test leads less susceptible to induced loss or breakage, such as, if run over with a cart or stepped on by personnel. Further, as the mating harness/umbilical cord/test leads containing electrical cabling can be much lighter than those containing optical cabling, there is advantageously a reduced likelihood of inducing loss at the connection to the testing unit/controller/analyzer due to pulling on the associated connector or connectors. Embodiments of the present invention embed lasers, LEDs, and/or receivers inside standard fiber optic style termini, which does not require direct contact with an optical cable to be tested, making such termini less susceptible to receiving or causing damage, and is easy or easier to remove as the standard fiber optic style termini which employs optical cables.

Specifically, embodiments of the present invention provide a fiber-optic testing apparatus. Such a fiber-optic testing apparatus, according to an embodiment of the present invention, can include, for example, an analyzer including a controller configured to provide a first electrical signal defining a transmit test signal and to receive a second electrical signal defining a return test signal and to determine an attenuation value between the transmit test signal and the return test signal to thereby determine an attenuation across one or more optical fibers of a fiber-optic harness under test. The analyzer also includes a plurality of electrical ports configured to electrically interface with a corresponding plurality of elongate electrical conductors defining a plurality of electrical test leads. The plurality of electrical test leads each have a first connector configured to operably connect to a corresponding one of the plurality of electrical ports to define a plurality of first test lead connectors, and a second connector adapted to mechanically and optically interface with a corresponding connector of the fiber-optic harness under test to define a plurality of second test lead connectors. Each of the plurality of second test lead connectors is adapted to perform at least one of the following functions: receive electrical signals from the controller and correspondingly transmit optical signals associated therewith to the corresponding connector of the fiber-optic harness under test, or receive optical signals from the corresponding connector of the fiber-optic harness under test and correspondingly transmit electrical signals associated therewith to the controller. The apparatus also includes a plurality of sets of test lead connector termini each positioned in a separate one of the plurality of second test lead connectors. Each test lead connector terminus is adapted to optically interface with a corresponding fiber-optic harness connector terminus positioned in one or more of the connectors of the fiber-optic harness under test. Each test lead connector terminus also includes a ferrule having an end face portion, an aperture extending into the end face portion of the ferrule, and an optically active element including a light-transmitting and/or light-receiving element, which is positioned within the aperture and which includes one or more electrical conductors extending therefrom in electrical communication with one or more of the plurality of electrical test leads.

Embodiments of the present invention also provide a fiber-optic terminus positioned in a test lead connector of an extended length electrical test lead of an analyzer of a fiber optic harness testing apparatus adapted to mechanically couple with one or more connectors of a fiber-optic harness under test. Such a fiber-optic terminus, according to an embodiment of the present invention, can include, for example, a ferrule having an end face portion, an aperture extending into the end face portion of the ferrule, and an optically active element including a light-transmitting and/or light-receiving element positioned within the aperture and having one or more electrical conductors extending therefrom in electrical communication with the extended length electrical test lead. The optically active element, positioned in the aperture extending into the ferrule, functions to electrically interface with the analyzer and to optically interface with a corresponding fiber-optic harness connector terminus positioned in one or more of the connectors of the fiber-optic harness under test to thereby perform at least one of the following functions: providing a first optical signal to the corresponding fiber-optic harness connector terminus responsive to a first electrical signal defining a transmit test signal, or providing a second electrical signal defining a return test signal responsive to a second optical signal received from the corresponding fiber-optic harness connector terminus responsive to the first optical signal.

Embodiments of the present invention also include methods of retrofitting fiber-optic termini for a test lead connector for an analyzer of an electrical conductor harness testing apparatus which uses electrical cabling in its mating harness, to thereby convert the electrical conductors harness testing apparatus into a fiber optic harness testing apparatus. Such a method, according to an embodiment of the present invention, can include, for example, the step of inserting an optically active element including a light-transmitting and/or light-receiving element and one or more electrical conductors extending therefrom within an aperture in a ferrule of a terminus of a test lead connector of an electrically conductive test lead for a harness testing apparatus to thereby configure the fiber-optic terminus to optically interface with a corresponding fiber-optic harness connector terminus positioned in a fiber-optic harness connector of a fiber-optic harness under test when the test lead connector is connected thereto. The method can also include the step of coupling the one or more electrical conductors of the optically active element to an extended length electrical test lead to thereby configure the fiber-optic terminus to electrically interface the corresponding fiber-optic harness connector terminus positioned in the fiber-optic harness connector of the fiber-optic harness under test with the analyzer of the harness testing apparatus when the test lead connector is connected thereto.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 4 is a sectional view of the pin-type terminus taken along the 4-4 line of FIG. 3 according to an embodiment of the present invention;

FIG. 5 is a partially perspective and partially sectional view of a socket-type terminus according to an embodiment of the present invention;

FIG. 6 is a sectional view of the socket-type terminus taken along the 6-6 line of FIG. 5 according to an embodiment of the present invention;

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout.

FIGS. 1-9 illustrate a single/multi-channel fiber-optic harness testing apparatus 30 which provides electrical cabling in its test leads in place of optical cabling, which is less susceptible to induced loss or breakage, such as, if run over with a cart or other equipment or personnel, or susceptible to changes in conductivity due to bending, which is cheaper to replace or fix if it is broken or damaged, which can be much lighter than those containing optical cabling, providing a reduced likelihood of inducing loss at the connection to the testing analyzer due to pulling on the associated connector or connectors, and which includes termini in its end connectors that include embedded lasers, LEDs, and/or optical receivers to provide an electrical to optical interface that does not require direct contact with an optical cable in the harness to be tested, making such termini less susceptible to receiving or causing damage and less susceptible to dirt or to damage during cleaning.

Figure 1:
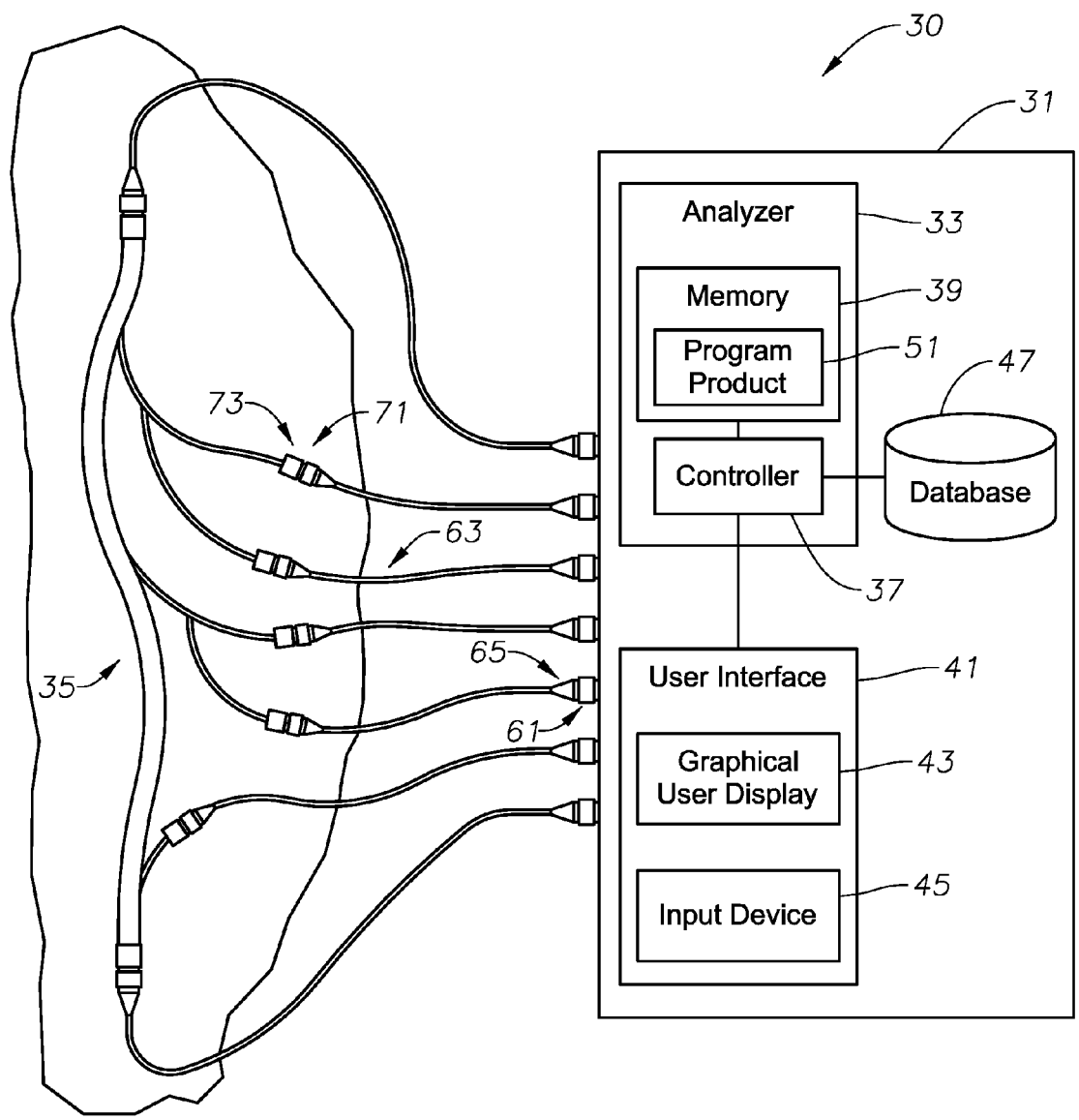
FIG. 1 is a schematic diagram of a fiber-optic harness testing apparatus according to an embodiment of the present invention.

More specifically, as perhaps best shown in FIG. 1, the apparatus 30 includes a housing 31 containing an analyzer 33 configured to provide a first electrical signal defining a transmit test signal and to receive a second electrical signal defining a return test signal and to determine an attenuation value between the transmit test signal and the return test signal to thereby determine an attenuation across one or more optical fibers of a fiber-optic harness under test 35. The analyzer 33 includes a controller 37, memory 39 coupled to the controller 37 to store software and/or database records therein, and a user interface 41 which can include a graphical display 43 for displaying graphical images, and a user input device 45 as known to those skilled in the art, to provide a user access to manipulate the software and database records. Note, the housing 31/analyzer 33/user interface 41 can be in the form of a personal computer or portable computing device, battery or electric powered, as known to those skilled in the art.

The analyzer 33 can include a database 47 stored in the memory 39 (internal or external) of the analyzer 33 and having a plurality of sets of data each separately describing testing configurations, testing analysis data, testing scenario data, aircraft fiber-optic harness configuration data, etc., as known to those skilled in the art. The analyzer 33 can also include firmware/software/program product 51, for example, stored in memory 39 of the analyzer 33 and adapted to control and manage application of the testing signals, a testing scenario, and/or a testing sequence as known to those skilled in the art. Note, the firmware/software/program product 51 can be in the form of microcode, programs, routines, and symbolic languages that provide a specific set for sets of ordered operations that control the functioning of the hardware and direct its operation, as known and understood by those skilled in the art. Note also, the firmware/software/program product 51, according to an embodiment of the present invention, need not reside in its entirety in volatile memory, but can be selectively loaded, as necessary, according to various methodologies as known and understood by those skilled in the art.

The apparatus 30 also includes a plurality of electrical ports 61 configured to electrically interface with a corresponding plurality of elongate electrical conductors defining a plurality of electrical test leads 63 (single wire or multi-wire), each including a first test lead connector 65 configured to operably connect to a corresponding one of the electrical ports 61, and a second test lead connector 71 (see also, FIG. 2) adapted to mechanically and optically interface with a corresponding connector 73 of the fiber-optic harness under test 35. As noted above, the electrical test leads 63 include at least one, but generally a plurality of electrical conduits (e.g., copper wire, etc.) rather than optical fiber as wire has been found to be less susceptible to damage. The electrically conductive wire comprising the test leads 63 is generally a minimum of approximately three feet long, but is more typically 10 to 20 feet long, to allow simultaneous access to multiple aircraft/vehicle fiber-optic harness connectors 73 which typically remain serpentined within the aircraft/vehicle structure during the test of the fiber-optic harness 35. The electrically conductive wire comprising the test leads 63 also preferably has a diameter of at least 0.125 mm or at least 36 gauge (0.127 mm) to provide both sufficient strength and malleability.

Each of the second test lead connectors 71 are adapted to perform at least one of the following functions: receive electrical signals from the controller 37/analyzer 33 and correspondingly transmit optical signals associated therewith to the corresponding connector 73 of the fiber-optic harness under test 35 to which it is connected, or receive optical signals from the corresponding connector 73 of the fiber-optic harness under test 35 to which it is connected, and correspondingly transmit electrical signals associated therewith to the controller 37/analyzer 33. As would be known to, and understood by, those skilled in the art, the receive optical signals function is a function matched with a sister connector 71 which transmits optical signals through optical cables of the fiber-optic harness under test 35. It is the determination of the level of attenuation between the transmit and receive optical signals that provides the impetus for the analyzer 33 to determine if individual optical cables under test within the fiber-optic harness under test 35 require replacement or repair.

Figure 2:
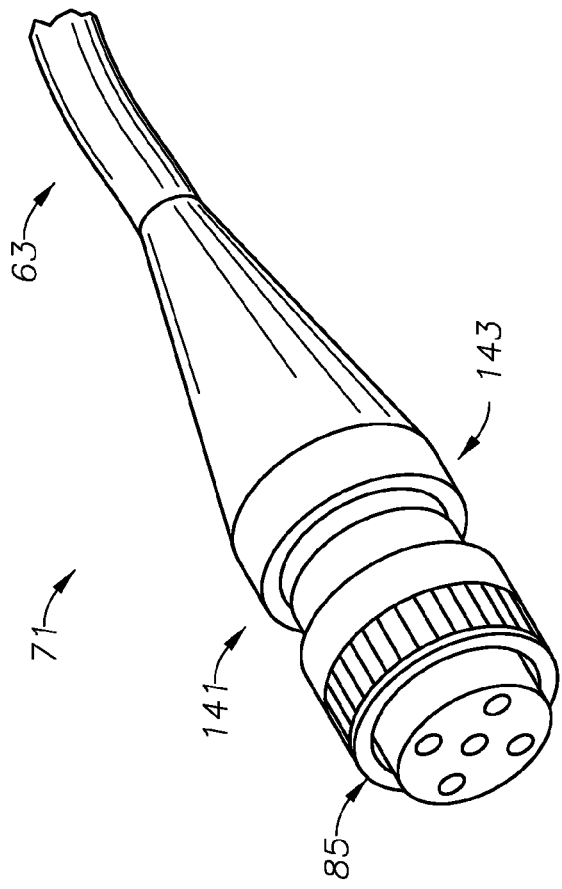
FIG. 2 is a sectional view of a test lead connector of a test lead of a fiber optic harness testing apparatus according to an embodiment of the present invention.
Figure 7:
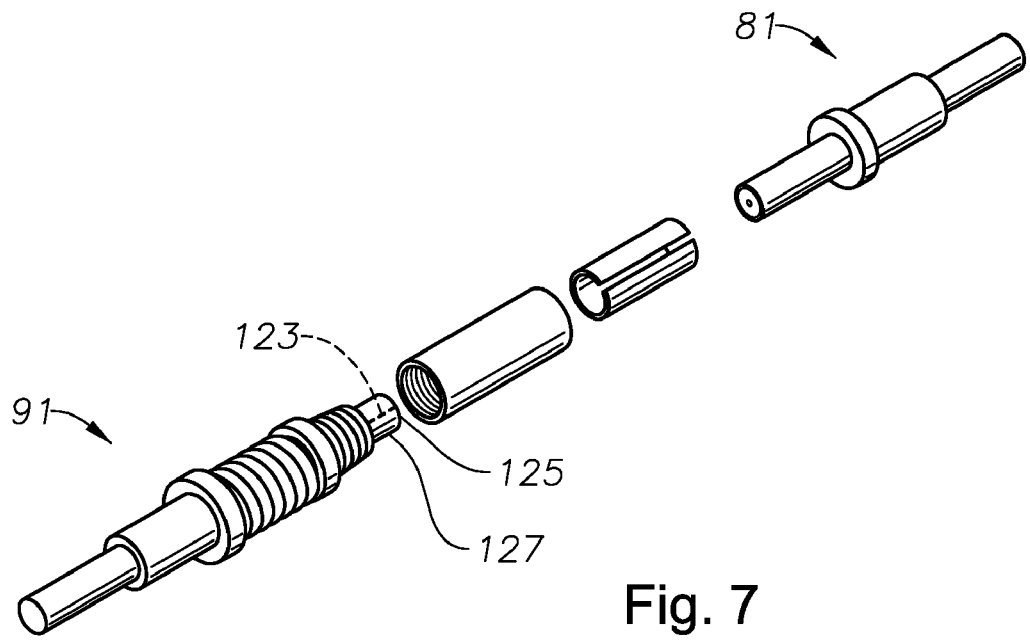
FIG. 7 is a partially exploded perspective view of a pin-type terminus of a connector of a fiber optic harness testing apparatus adjacent a socket-type terminus of a connector of a fiber-optic harness under test according to an embodiment of the present invention.
Figure 8:
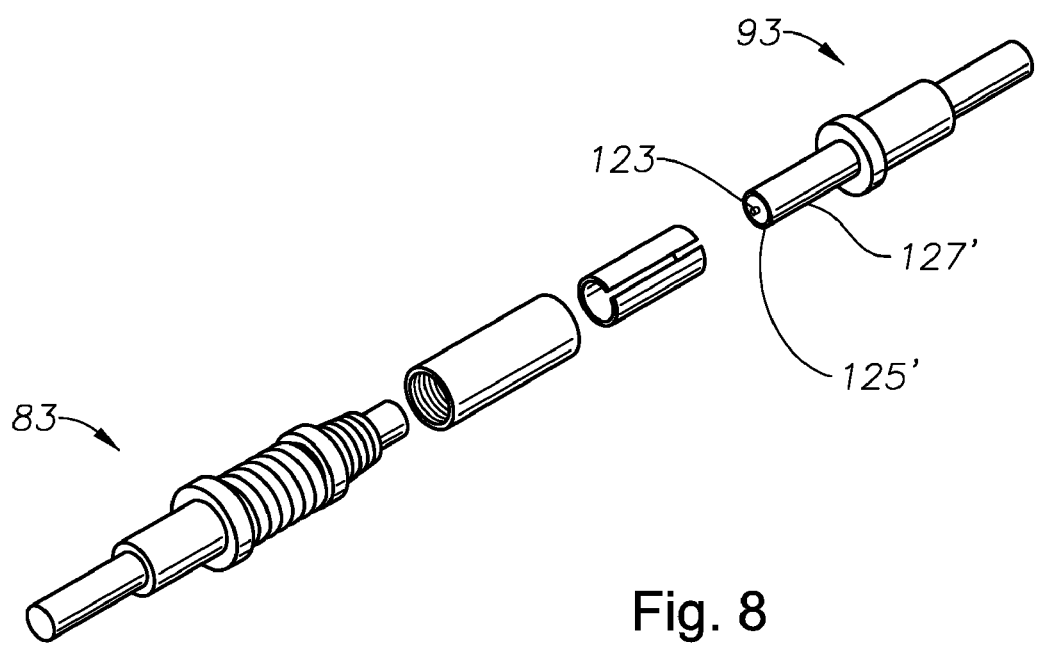
FIG. 8 is a partially exploded perspective view of a socket-type terminus of a connector of a fiber optic harness testing apparatus adjacent a pin-type terminus of a connector of a fiber-optic harness under test according to an embodiment of the present invention.

As the signals provided through the test leads 63 are electrical signals, each test lead connector 71 includes at least one, but preferably a set of test lead connector termini 81, 83 (see, e.g., FIGS. 3 and 5) positioned in a distal portion 85 of the test lead connector 71 (see, e.g., FIG. 2). As shown in FIGS. 7 and 8, respectively, each test lead connector terminus 81, 83, of the set of test lead connector termini 81, 83, is adapted to optically interface with a corresponding fiber-optic harness connector terminus 91, 93, positioned in one or more of the connectors 73 of the fiber-optic harness under test 35. The sets of test lead connector termini 81, 83, are either pin-type termini 81 (see FIGS. 3 and 4) or socket-type termini 83 (see FIGS. 5 and 6), but generally not a mix of both, according to an embodiment of the present invention.

Figure 3:
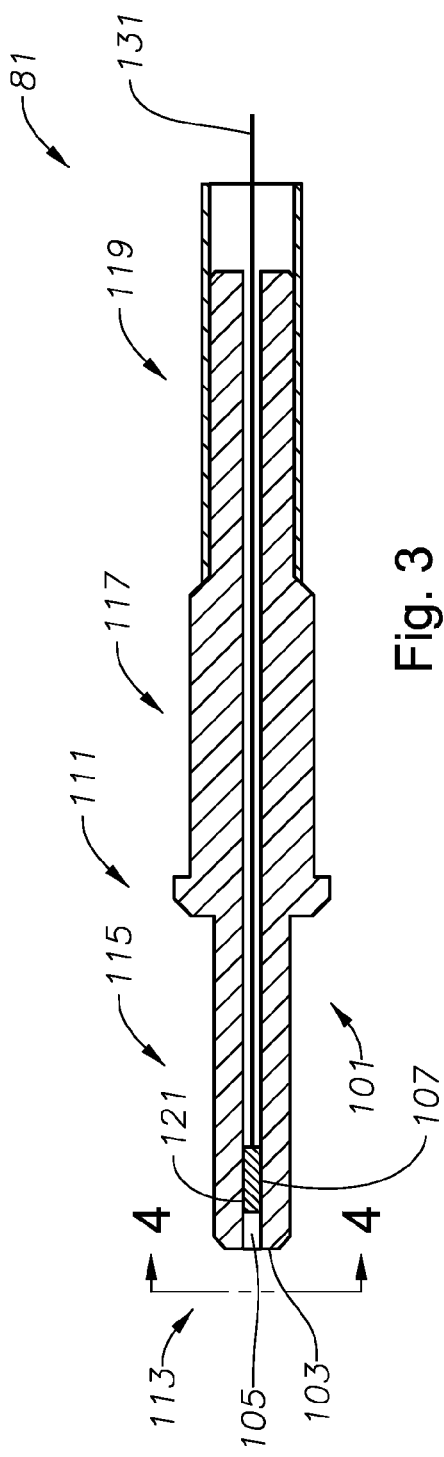
FIG. 3 is a partially perspective and partially sectional view of a pin-type terminus according to an embodiment of the present invention.

Referring to FIGS. 3 and 4, each pin-type test lead connector terminus 81 includes a ferrule 101 having an end face portion 103, an aperture 105 extending into the end face portion 103 of the ferrule 101, and an optically active element 107 positioned within the aperture 105. The ferrule 101 includes a proximal end portion 111, a distal end portion 113 that includes the end face portion 103, and an elongate body 115 extending therebetween. The ferrule 101 is typically comprised of a ceramic, stainless-steel, or an engineering plastic such as liquid crystal polymer (LCP), polycarbonate, delrin, or lexan. The aperture 105 in the ferrule 101 preferably extends between the proximal end portion 111 and the distal end portion 113 of the ferrule 101, and through a main body and proximal end portion 117, 119, of the terminus 81. Additionally, the aperture 105 has a diameter in a range of preferably between approximately 0.5 mm and 2.0 mm, and more preferably 1.0 mm+/−10 percent.

According to a preferred configuration, the optically active element 107 is positioned within the aperture 105 so that a distal end portion 121 of the optically active element 107 is longitudinally recessed within the aperture 105 with respect to the end face portion 103 of the ferrule 101 of the test lead connector terminus 81, to thereby prevent inadvertent contact with an optical fiber 123 under test extending from an end face portion 125 of a ferrule 127 of the corresponding fiber-optic harness connector terminus 91 (see FIG. 7). The distance (depth of recess) between the end face portion 103 of the ferrule 101 of the test lead connector terminus 81 and the distal end portion 121 of the optically active element 107 is preferably between approximately 10 microns and 100 microns, which is generally sufficient to prevent contact with the end face portion of the optical fiber 123 when the test lead connector 71 (having pin-type termini 81) is coupled with the fiber-optic harness connector 73 (e.g., having socket-type termini 91), i.e., when the one or more termini 81 are coupled with the corresponding one or more termini 91 such that each end face portion 103 of the ferrule 101 of the termini 81 is in physical contact with the end face portion 125 of the ferrule 127 of each corresponding fiber-optic harness connector terminus 91.

Similarly, referring to FIGS. 5 and 6, each socket-type test lead connector terminus 83 includes a ferrule 101' having an end face portion 103', an aperture 105' extending into the end face portion 103', and an optically active element 107 positioned within the aperture 105'. The ferrule 101' includes a proximal end portion 111', a distal end portion 113' that includes the end face portion 103', and an elongate body 115' extending therebetween. The aperture 105' in the ferrule 101' preferably extends between the proximal end portion 111' and the distal end portion 113' of the ferrule 101', and through a main body and proximal end portion 117', 119', of the terminus 83. Additionally, as with the pin-type test lead connector terminus 81, the aperture 105' of the socket-type test lead connector terminus 83 has a diameter in a range of preferably between approximately 0.5 mm and 2.0 mm, and more preferably 1.0 mm+/−10 percent.

According to a preferred configuration, as with the pin-type test lead connector terminus 81, the optically active element 107 located in the socket-type test lead connector terminus 83 is positioned within the aperture 105' so that a distal end portion 121 of the optically active element 107 is longitudinally recessed within the aperture 105' with respect to the end face portion 103' of the ferrule 101' of the test lead connector terminus 83, to thereby prevent inadvertent contact with an optical fiber 123 under test extending from an end face portion 125' of a ferrule 127' of the corresponding fiber-optic harness connector terminus 93 (see FIG. 8). The distance (depth of recess) between the end face portion 103' of the ferrule 101' of the test lead connector terminus 83 and the distal end portion 121 of the optically active element 107 is preferably between approximately 10 microns and 100 microns, which is generally sufficient to prevent contact with the end face portion of the optical fiber 123 when the test lead connector 71 (e.g., having socket-type termini 83) is coupled with the fiber-optic harness connector 73 (e.g., having pin-type termini 93), i.e., when the one or more termini 83 are coupled with the corresponding one or more termini 93 such that the end face portion 103' of the ferrule 101' of each termini 83 is in physical contact with the end face portion 125' of the ferrule 127' of each corresponding fiber-optic harness connector terminus 93.

For both the pin-type terminus 81 and the socket-type terminus 83, the optically active element 107 includes a light-transmitting element, a light-receiving element, or both, depending upon the configuration of the respective fiber-optic harness connector 73. The optically active element 107 can be, for example, a laser, a light emitting diode, and/or a, indium gallium arsenide (InGaAs) receiver, etc., depending upon the desired configuration of the respective test lead connector 71.

For both the pin-type terminus 81 and the socket-type terminus 83, the optically active element 107 also includes one or more electrical conductors 131 extending from the optically active element 107, which are connected (electrically coupled) to be in electrical communication with one or more electrical test leads 63. According to a preferred configuration, the one or more electrical conductors 131 of the optically active element 107 extend longitudinally from the optically active element 107, through the body 115, 115', of the ferrule 101, 101', through the proximal end portion 111, 111', of the ferrule 101, 101', and through a proximal end portion 119, 119', of the test lead connector terminus 81, 83.

As shown in FIG. 2, each of the second test lead connectors 71 can include a backshell portion 141, which provides standard electrical connectors (not shown) or other connecting means known to those skilled in the art, to provide a test lead connector-active element interface with the one or more electrical conductors 131 of the optically active element 107 and an electrically conductive portion of the test lead connector 73. Correspondingly, the one or more electrical conductors 131 of the optically active element 107 of each of the termini 81, 83, extend longitudinally from the optically active element 107, through the body of the respective ferrule 101, 101', through the proximal end portion 111, 111', of the respective ferrule 101, 101', and through a main body and proximal end portion 117, 119, 117', 119', of the terminus 81, 83, respectively, to a location within the backshell portion 141 of the respective second test lead connector 71 of the respective test lead 63. Each of the second test lead connectors 71 also include a grommet portion 143 which provides standard electrical and physical connectors (not shown) or other connecting means known to those skilled in the art to provide a test lead connector-test lead interface with the test lead connector 71 and the distal end portion of the associated electrical test lead 63.

As further shown in FIG. 2, to provide multichannel capability, each test lead connector 71 can include a set of typically eight or more test lead connector termini 81, 83, depending upon the configuration of the connectors 73 of the fiber-optic harness under test 35. Correspondingly, the backshell portion 141 of each test lead connector 71 has provisions for receiving and connecting eight or more sets of conductors 131 with eight or more sets of wired conductors which can form the respective test lead 63. Note, according to an alternative configuration, rather than provide a separate one or more wires for each terminus 81, 83, located within the respective test lead connector 71, the backshell portion 141 can include a transmitter or receiver circuit adapted to multiplex the individual signals from the termini 81, 83, over a respective test lead 63 having only one or two wires servicing the eight or more termini 81, 83.

In operation, after a user attaches one or more test leads 63 to the output ports 61 of the fiber optic harness testing apparatus 30 via test lead connectors 65 (if not already permanently affixed), and attaches the one or more test leads 63 via test lead connectors 71 to a corresponding aircraft fiber-optic harness connectors 73, the analyzer 33 can retrieve a signal scenario on database 47, and for each optical fiber 123 of the fiber-optic harness under test 35, can transmit an electrical signal developed from the signal scenario. Such signal is transmitted over one or more elongate wire conductors forming one of the test leads 63 and to the test lead connector 71 located at the distal end of the test lead 63. A transmitter form of the optically active element 107 located in the respective terminus 81, 83, receives the electrical signal/scenario and converts the electrical signal to an optical signal which is sent to an optical fiber 123 positioned in a counterpart fiber-optic harness connector terminus 91, 93, located within a corresponding fiber-optic harness connector 73 of the fiber-optic harness under test 35. Under most circumstances, at least a portion of the optical signal emerges through the optical fiber 123 extending through a terminus 91, 93, of a downstream fiber-optic harness connector 73 which is connected to a counterpart test lead connector 71 and test lead 63 prepared to receive the optical signal. Accordingly, the downstream terminus 81, 83, positioned in the downstream test lead connector 71 includes a receiver form of optically active element 107 located therein, which receives the optical signal and converts it into an electrical signal which is then translated through a counterpart one or more elongate wire conductors forming a different one of the test leads 63, and to the analyzer 33 which, after accounting for signal attenuation due to wire line losses and optical equivalent energy conversion losses, compares the electrical signals received by the analyzer 33 to the electrical signal sent by the analyzer 33 to determine an amount of optical attenuation present in the optical fiber 123, between the associated connectors 73 of the fiber-optic harness under test 35, which provides an indication of the health of the optical fiber 123 being tested.

Figure 9:
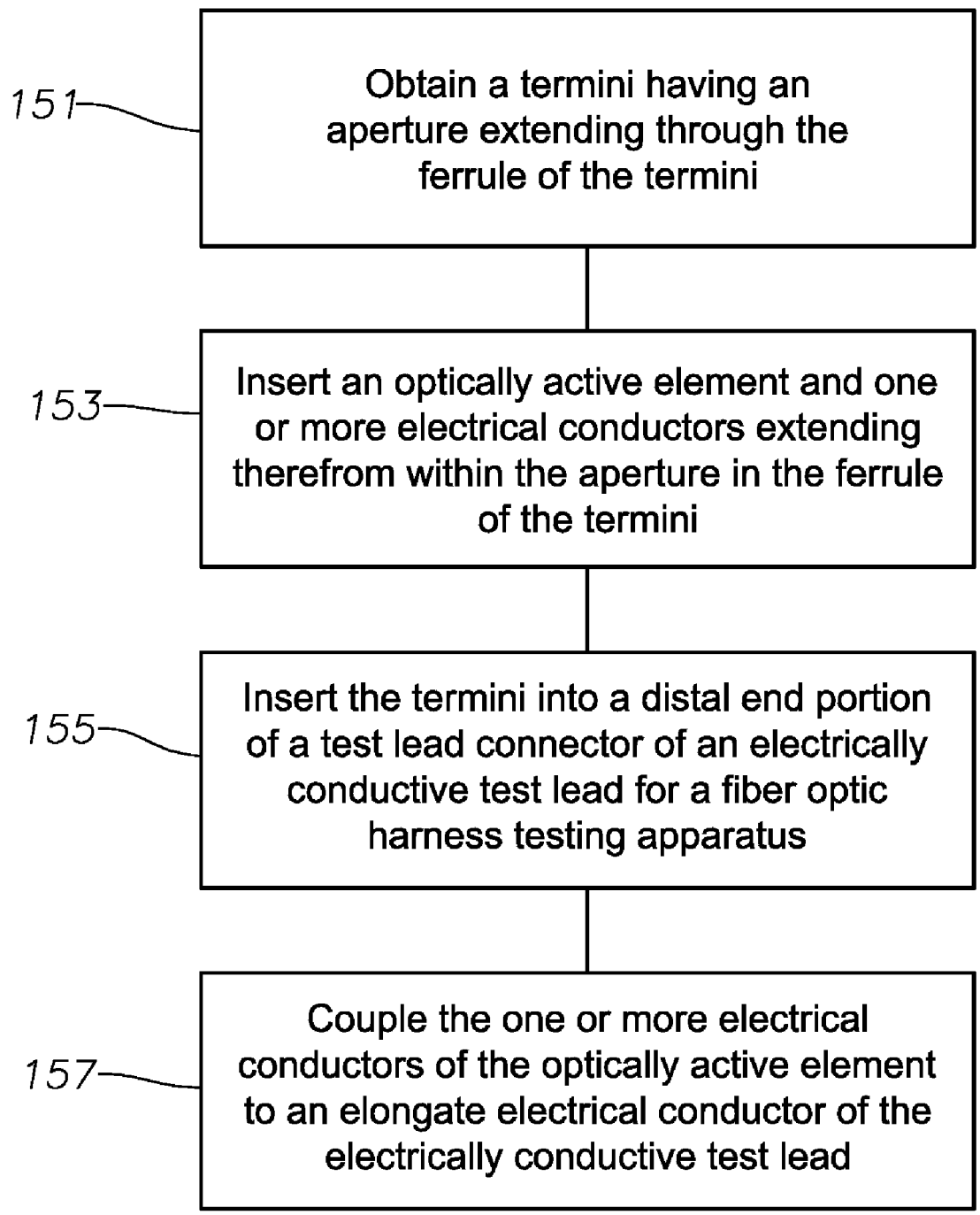
FIG. 9 is a schematic block flow diagram of a method of retrofitting fiber-optic termini for a fiber optic harness testing apparatus according to an embodiment of the present invention.

Embodiments of the present invention also include methods of retrofitting fiber-optic termini 81, 83, for a test lead connector 71 for an analyzer 33 of a harness testing apparatus 30 which uses electrical cabling instead of optical cabling in its mating harness. As shown in FIG. 9, such a method, according to an embodiment of the present invention, can include, for example, the step of obtaining one or more termini 81, 83, each having an aperture 105, 105', extending between a proximal end portion 111, 111', and a distal end portion 113, 113', of a ferrule 101, 101', and through a main body and proximal end portion 117, 119, 117', 119', of the termini 81, 83 (block 151). The aperture 105, 105', should have a diameter in a range of preferably between approximately 0.5 mm and 2.0 mm, and more preferably 1.0 mm+/− 10 percent. The aperture 105, 105', can be pre-formed by the manufacturer, formed or enlarged via close tolerance machining, or created during molding of the ferrule 101, 101', when so formed.

The method can also include the steps of inserting an optically active element 107 including either a light-transmitting element, light-receiving element, or both, and one or more electrical conductors 131 extending therefrom, within the aperture 105, 105', in the ferrule 101, 101', of each of the termini 81, 83, to thereby configure the fiber-optic termini 81, 83, to each optically interface with a corresponding fiber-optic harness connector terminus 91, 93, positioned in a fiber-optic harness connector 73 of a fiber-optic harness under test 35 (block 153); and inserting the one or more termini 81, 83, into a distal end portion 85 of a test lead connector 71 of an electrically conductive test lead 63, to create a test lead connector 71 for a fiber optic harness testing apparatus 30 operable to interface with a corresponding fiber-optic harness connector 73 of the fiber-optic harness under test 35 (block 155). The optically active element 107 is preferably positioned (recessed) within the aperture 105, 105', so that a distance between the end face portion 103, 103', of the ferrule 101, 101', of the termini 81, 83, and a distal end portion 121 of the optically active element 107 is between approximately 10 microns and 100 microns, to thereby prevent inadvertent contact with the optical fiber 123 under test extending from the end face portion 125, 125', of the ferrule 101, 101', of the corresponding fiber-optic harness connector terminus 91, 93. The one or more electrical conductors 131 of the optically active element 107 are inserted to extend longitudinally through the body 115, 115', of the ferrule 101, 101', through the proximal end portion 111, 111', of the ferrule 101, 101', and through a main body and proximal end portion 117, 117', 119, 119', of the termini 81, 83, respectively.

The method can also include the step of coupling the one or more electrical conductors 131 of the optically active element 107 of each inserted termini 81, 83, to a separate elongate electrical conductor of an electrically conductive test lead to create a test lead 63 for the fiber optic harness testing apparatus 30 operable for electrically connecting the analyzer 33 of the fiber optic harness testing apparatus 30 with the test lead connector 71, which optically connects to a corresponding fiber-optic harness connector 73 of the fiber-optic harness under test 35 (block 157). Notably, electrical connection of the electrical conductors 131 with the test lead 63 can be made within a backshell portion 141 of the test lead connector 71.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification. For example, although the description primarily focuses on That claimed is:

1. A fiber-optic harness testing apparatus comprising:
    an analyzer including a controller configured to provide a first electrical signal defining a transmit test signal and to receive a second electrical signal defining a return test signal and to determine an attenuation value between the transmit test signal and the return test signal to thereby determine an attenuation across one or more optical fibers of a fiber-optic harness under test;
    a plurality of electrical ports configured to electrically interface with a corresponding plurality of elongate electrical conductors defining a plurality of electrical test leads;
    the plurality of electrical test leads each having a first connector configured to operably connect to a corresponding one of the plurality of electrical ports to define a plurality of first test lead connectors, and a second connector adapted to mechanically and optically interface with a corresponding connector of the fiber-optic harness under test to define a plurality of second test lead connectors, each of the plurality of second test lead connectors adapted to perform at least one of the following functions: receive electrical signals from the controller and correspondingly transmit optical signals associated therewith to the corresponding connector of the fiber-optic harness under test, or receive optical signals from the corresponding connector of the fiber-optic harness under test and correspondingly transmit electrical signals associated therewith to the controller; and a plurality of sets of test lead connector termini, each set of test lead connector termini positioned in a separate one of the plurality of second test lead connectors, each test lead connector terminus adapted to optically interface with a corresponding fiber-optic harness connector terminus positioned in one or more of the connectors of the fiber-optic harness under test, each test lead connector terminus also including a ferrule having an end face portion, an aperture extending into the end face portion of the ferrule, and an optically active element comprising at least one of a light-transmitting or light-receiving element and positioned within the aperture and having one or more electrical conductors extending therefrom in electrical communication with one or more of the plurality of electrical test leads.

2. The apparatus as defined in claim 1, wherein the ferrule includes a proximal end portion, a distal end portion, and a body extending therebetween, wherein the aperture in the ferrule extends between the proximal end portion and the distal end portion of the ferrule, and wherein the aperture has a diameter in a range of between approximately 0.5 mm and 2.0 mm.

3. The apparatus as defined in claim 2, wherein the optically active element is positioned within the aperture so that a distal end portion of the optically active element is longitudinally recessed within the aperture with respect to the end face portion of the ferrule of the test lead connector terminus to thereby prevent inadvertent contact with an optical fiber under test extending from an end face portion of a ferrule of the corresponding fiber-optic harness connector terminus, and wherein the one or more electrical conductors of the optically active element extend longitudinally from the optically active element, through the body of the ferrule, through the proximal end portion of the ferrule, and through a proximal end portion of the test lead connector terminus.

4. The apparatus as defined in claim 3, wherein a distance between the end face portion of the ferrule of the test lead connector terminus and the distal end portion of the optically active element is between approximately 10 microns and 100 microns, and wherein each of the plurality of electrical test leads have a minimum length of approximately three feet.

5. The apparatus as defined in claim 1, wherein each of the plurality of second test lead connectors includes a backshell portion;

wherein the ferrule of each of the plurality of termini includes a proximal end portion, a distal end portion, and a body extending therebetween;

wherein the one or more electrical conductors of the optically active element of the each of the plurality of termini extend longitudinally from the optically active element, through the body of the respective ferrule, and through the proximal end portion of the respective ferrule to a location within the backshell portion of the respective second test lead connector of the respective test lead;

wherein each set of test lead connector termini of the each second test lead connector includes at least eight termini; and wherein each of the plurality of electrical test leads includes a corresponding at least eight conductors, each of the at least eight conductors electrically connected within the backshell portion of the respective second test lead connector of the respective electrical test lead, to a separate set of the one or more electrical conductors of the respective optically active elements.

6. A fiber-optic harness testing apparatus to provide a first electrical signal defining a transmit test signal and to receive a second electrical signal defining a return test signal and to determine an attenuation value between the transmit test signal and the return test signal to thereby determine an attenuation across one or more optical fibers of a fiber-optic harness under test, the apparatus comprising:

an analyzer;

a plurality of electrical ports configured to electrically interface with a corresponding plurality of elongate electrical conductors defining a plurality of electrical test leads;

the plurality of electrical test leads each having a first connector configured to operably connect to a corresponding one of the plurality of electrical ports to define a plurality of first test lead connectors, and a second connector adapted to mechanically and optically interface with a corresponding connector of the fiber-optic harness under test to define a plurality of second test lead connectors, each of the plurality of second test lead connectors adapted to perform at least one of the following functions: receive electrical signals from the analyzer and correspondingly transmit optical signals associated therewith to the corresponding connector of the fiber-optic harness under test, or receive optical signals from the corresponding connector of the fiber-optic harness under test and correspondingly transmit electrical signals associated therewith to the analyzer; and a plurality of sets of test lead connector termini, each set of test lead connector termini positioned in a separate one of the plurality of second test lead connectors, each test lead connector terminus adapted to optically interface with a corresponding fiber-optic harness connector terminus positioned in one or more of the connectors of the fiber-optic harness under test, each test lead connector terminus also including a ferrule having an end face portion, an aperture extending into the end face portion of the ferrule, and an optically active element comprising at least one of a light-transmitting or light-receiving element positioned within the aperture and having one or more electrical conductors extending therefrom in electrical communication with one or more of the plurality of electrical test leads.

7. The apparatus as defined in claim 6, wherein the ferrule includes a proximal end portion, a distal end portion, and a body extending therebetween, wherein the optically active element is substantially longitudinally recessed within the aperture with respect to the end face portion of the ferrule of the test lead connector terminus to thereby prevent inadvertent contact with an optical fiber under test extending from an end face portion of a ferrule of the corresponding fiber-optic harness connector terminus, and wherein the one or more electrical conductors of the optically active element extend longitudinally from the optically active element, through the body of the ferrule, through the proximal end portion of the ferrule, and through a proximal end portion of the test lead connector terminus.

8. The apparatus as defined in claim 6,
wherein each of the plurality of second test lead connectors include a backshell portion;
wherein the ferrule includes a proximal end portion, a distal end portion, and a body extending therebetween;
wherein the optically active element is positioned within the aperture so that a distance between the end face portion of the ferrule of the test lead connector terminus and a distal end portion of the optically active element is between approximately 10 microns and 100 microns to thereby prevent inadvertent contact with an optical fiber under test extending from an end face portion of a ferrule of the corresponding fiber-optic harness connector terminus;
wherein the one or more electrical conductors of the optically active element extend longitudinally from the optically active element, through the body of the ferrule, and through the proximal end portion of the ferrule to a location within the backshell portion of the respective second test lead connector of the respective test lead; and
wherein the respective electrical test lead is electrically connected to the one or more electrical conductors of the optically active element within the backshell portion of the respective second test lead connector.

9. The apparatus as defined in claim 6, wherein the ferrule includes a proximal end portion, a distal end portion, and a body extending therebetween, and wherein the aperture in the ferrule extends between the proximal end portion and the distal end portion of the ferrule, wherein the aperture has a diameter in a range of between approximately 0.5 mm and 2.0 mm, and wherein each of the plurality of electrical test leads have a minimum length of approximately three feet, and has a minimum diameter of approximately 0.125 mm.

10. The apparatus as defined in claim 6, wherein the ferrule is comprised of one or more of the following materials: stainless steel, liquid crystal polymer, polycarbonate, delrin, or lexan.

11. A fiber-optic terminus positioned in a test lead connector of an extended length electrical test lead of an analyzer of a fiber-optic harness testing apparatus adapted to mechanically couple with one or more connectors of a fiber-optic harness under test, the fiber-optic terminus comprising:
a ferrule having an end face portion;
an aperture extending into the end face portion of the ferrule; and
an optically active element comprising at least one of a light-transmitting or light-receiving element positioned within the aperture and having one or more electrical conductors extending therefrom in electrical communication with the extended length electrical test lead, the optically active element positioned in the aperture extending into the ferrule to electrically interface with the analyzer and to optically interface with a corresponding fiber-optic harness connector terminus positioned in one or more of the connectors of the fiber-optic harness under test to thereby perform at least one of the following functions: providing a first optical signal to the corresponding fiber-optic harness connector terminus responsive to a first electrical signal defining a transmit test signal, or providing a second electrical signal defining a return test signal responsive to a second optical signal received from the corresponding fiber-optic harness connector terminus responsive to the first optical signal.

12. The terminus as defined in claim 11, wherein the ferrule includes a proximal end portion, a distal end portion, and a body extending therebetween, and wherein the aperture in the ferrule extends between the proximal end portion and the distal end portion of the ferrule, wherein the aperture has a diameter in a range of between approximately 0.5 mm and 2.0 mm, and wherein extended length electrical test lead of the analyzer has a minimum length of approximately three feet, and has a minimum diameter of approximately 0.127 mm.

13. The terminus as defined in claim 11, wherein the ferrule includes a proximal end portion, a distal end portion, and a body extending therebetween, wherein the optically active element is substantially longitudinally recessed within the aperture with respect to the end face portion of the ferrule of the test lead connector terminus to thereby prevent inadvertent contact with an optical fiber under test extending from an end face portion of a ferrule of the corresponding fiber-optic harness connector terminus, and wherein the one or more electrical conductors of the optically active element extend longitudinally from the optically active element, through the body of the ferrule, through the proximal end portion of the ferrule, and through a proximal end portion of the test lead connector terminus.

14. The terminus as defined in claim 13, wherein the optically active element is positioned within the aperture so that a distance between the end face portion of the ferrule of the test lead connector terminus and a distal end portion of the optically active element is between approximately 10 microns and 100 microns to thereby prevent inadvertent contact with the optical fiber under test extending from the end face portion of the ferrule of the corresponding fiber-optic harness connector terminus.

15. The terminus as defined in claim 11, wherein the test lead connector includes a backshell portion containing a controller, wherein the one or more electrical conductors of the optically active element are electrically coupled to the backshell portion, and wherein the respective electrical test lead is electrically coupled to the backshell portion of the respective second test lead connector.

16. A method of retrofitting fiber-optic termini for a test lead connector for an analyzer of a harness testing apparatus, the method comprising the steps of:
inserting an optically active element comprising one or more of a light-transmitting or light-receiving element and one or more electrical conductors extending therefrom within an aperture in a ferrule of a terminus of a test lead connector of an electrically conductive test lead for a harness testing apparatus to thereby configure the fiber-optic terminus to optically interface with a corresponding fiber-optic harness connector terminus positioned in a fiber-optic harness connector of a fiber-optic harness under test when the test lead connector is connected thereto, the aperture extending between a proximal end portion and a distal end portion of the ferrule; and
coupling the one or more electrical conductors of the optically active element to an extended length electrical test lead to thereby configure the fiber-optic terminus to electrically interface the corresponding fiber-optic harness connector terminus positioned in the fiber-optic harness connector of the fiber-optic harness under test with the analyzer of the harness testing apparatus when the test lead connector is connected thereto.

17. The method as defined in claim 16, wherein the ferrule includes a proximal end portion, a distal end portion, and an elongated body extending therebetween, wherein the aperture in the ferrule is extends between the proximal end portion and the distal end portion of the ferrule, wherein the aperture is machined or molded to have a diameter in a range of between approximately 0.5 mm and 2.0 mm, and wherein the extended length electrical test lead has a minimum length of approximately three feet.

18. The method as defined in claim 16, wherein the ferrule includes a proximal end portion, a distal end portion, and a body extending therebetween, wherein the optically active element is substantially longitudinally recessed within the aperture with respect to the end face portion of the ferrule to thereby prevent inadvertent contact with an optical fiber under test extending from an end face portion of a ferrule of the fiber-optic harness connector terminus, and wherein the one or more electrical conductors of the optically active element are inserted to extend longitudinally through the body of the ferrule, through the proximal end portion of the ferrule, and through a proximal end portion of the test lead connector terminus.

19. The method as defined in claim 18, wherein the optically active element is positioned within the aperture so that a distance between the end face portion of the ferrule of the test lead connector terminus and a distal end portion of the optically active element is between approximately 10 microns and 100 microns to thereby prevent inadvertent contact with the optical fiber under test extending from the end face portion of the ferrule of the corresponding fiber-optic harness connector terminus.

20. The method as defined in claim 16,
wherein the test lead connector includes a backshell portion electrically coupled to the extended length electrical test lead; and
wherein the step of coupling the one or more electrical conductors of the optically active element to the extended length electrical test lead includes the step of electrically coupling the one or more electrical conductors of the optically active element to the extended length test lead within the backshell portion of the test lead connector.

21. The method as defined in claim 16, wherein the test lead connector includes a plurality of termini, the method further comprising performing the steps of inserting and coupling on each of the plurality of termini.

* * * * *